US008352715B2

(12) United States Patent
Mao

(10) Patent No.: US 8,352,715 B2
(45) Date of Patent: Jan. 8, 2013

(54) METHOD FOR BOOTING UP A MOBILE PHONE QUICKLY AND THE MOBILE PHONE THEREOF

(75) Inventor: Hua-Jen Mao, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 1410 days.

(21) Appl. No.: 11/967,041

(22) Filed: Dec. 29, 2007

(65) Prior Publication Data

US 2009/0124244 A1 May 14, 2009

(30) Foreign Application Priority Data

Nov. 14, 2007 (CN) .......................... 2007 1 0202540

(51) Int. Cl.
*G06F 9/00* (2006.01)
*G06F 9/24* (2006.01)
*G06F 15/177* (2006.01)

(52) U.S. Cl. ................ 713/1; 713/2; 713/100; 711/100; 711/207; 707/752; 707/753; 707/825

(58) Field of Classification Search .................. 713/1, 2, 713/100; 711/100, 207; 707/752, 753, 825
See application file for complete search history.

(56) References Cited

U.S. PATENT DOCUMENTS

| 6,226,667 | B1 * | 5/2001 | Matthews et al. | 709/203 |
|---|---|---|---|---|
| 7,793,088 | B2 * | 9/2010 | Inohiza | 713/1 |
| 7,848,781 | B2 * | 12/2010 | Bhat et al. | 455/558 |
| 2002/0112116 | A1 * | 8/2002 | Nelson | 711/103 |
| 2002/0169004 | A1 * | 11/2002 | Thil et al. | 455/558 |
| 2005/0021934 | A1 * | 1/2005 | Dong et al. | 713/1 |
| 2005/0086464 | A1 | 4/2005 | Lee | |
| 2005/0125396 | A1 * | 6/2005 | Liu | 707/3 |
| 2007/0100906 | A1 * | 5/2007 | Cheng et al. | 707/201 |
| 2007/0124572 | A1 * | 5/2007 | Coulson | 713/1 |
| 2007/0202749 | A1 * | 8/2007 | Bhat et al. | 439/630 |
| 2008/0209198 | A1 * | 8/2008 | Majni et al. | 713/2 |
| 2008/0242362 | A1 * | 10/2008 | Duarte | 455/566 |
| 2009/0319478 | A1 * | 12/2009 | Proux et al. | 707/3 |

FOREIGN PATENT DOCUMENTS

| CN | 1333643 A | 1/2002 |
|---|---|---|
| CN | 1856138 A | 11/2006 |

* cited by examiner

*Primary Examiner* — Jaweed A Abbaszadeh
(74) *Attorney, Agent, or Firm* — Altis Law Group, Inc.

(57) ABSTRACT

A method for booting up a mobile phone quickly is disclosed. The method includes the steps of: driving hardware devices when the mobile phone is turned on; initializing application software installed in the mobile phone; loading data in the mobile phone from a storage to a memory; creating a table for each kind of data in the memory, and ordering data in each table according to a particular order condition; converting each table into a binary file, and storing the binary file in the storage; loading the binary file of each table directly from the storage to the memory when the mobile phone is turned on. A related quickly booting mobile phone is also disclosed.

4 Claims, 3 Drawing Sheets

METHOD FOR BOOTING UP A MOBILE PHONE QUICKLY AND THE MOBILE PHONE THEREOF

BACKGROUND OF THE INVENTION

1. Field of the Invention

The present invention is related to a method for booting up a mobile phone quickly and a mobile phone that can be quickly booted up.

2. Description of Related Art

Currently, when a mobile phone boots up, the operating system would first be loaded, and then arrange data in memory accordingly before the mobile phone is operable. For example phone book data must be first loaded into memory and then sorted alphabetically according to the names in the phone book. The more data in the mobile phone, the longer it takes to load and arrange the data before the mobile phone is operable.

As data capacity of mobile phone increases, more and more data can be stored in the mobile phone, and mobile phones storing one hundred phone numbers becomes common. However, the data processing capacity of mobile phones has not increased much, and the time a mobile phone needs to load and arrange, for example, thousands of phone numbers is long, delaying the time before a mobile phone is operable after powering on.

Further, additional application software (such as games, calendar, calculator, etc) are also installed in the mobile phone, and each additional application software needs to be initialized before the mobile phone is operable. As a result, the central processing unit (CPU) of a mobile phone needs to process many additional tasks and further delaying the time the mobile phone becomes operable after powering on.

Therefore, what is needed is a method for booting up a mobile phone quickly and the mobile phone thereof.

SUMMARY OF THE INVENTION

A mobile phone that can be booted up quickly is provided in accordance with a preferred embodiment. The mobile phone includes a driving module, an initializing module, a loading module, a data sorting/arranging module, and a file creating module. The driving module is configured for driving hardware devices when the mobile phone is turned on. The initializing module is configured for initializing application software installed in the mobile phone. The loading module is configured for loading data in the mobile phone from a storage to a memory. The data sorting/arranging module is configured for creating a table for each kind of data in the memory, and ordering data in each table according to a particular order condition. The file creating module is configured for converting each table into a binary file, and storing the binary file in the storage; the loading module being further configured for loading the binary file of each table directly from the storage to the memory when the mobile phone is turned on. The mobile phone further includes an updating module configured for updating a corresponding binary file when new data are added in the storage.

A method for booting up a mobile phone quickly is also provided. The method includes the steps of: driving hardware devices when a mobile phone is turned on; initializing application software installed in the mobile phone; loading data in the mobile phone from a storage to a memory; creating a table for each kind of data in the memory, and ordering data in each table according to a particular order condition; converting each table into a binary file, and storing the binary file in the storage; loading the binary file of each table directly from the storage to the memory when the mobile phone is turned on. The method further includes the step of: updating a corresponding binary file when new data are added in the storage.

Other systems, methods, features, and advantages of the present invention will become apparent to one with skill in the art upon examination of the following drawings and detailed description.

DETAILED DESCRIPTION OF THE INVENTION

Figure 1:
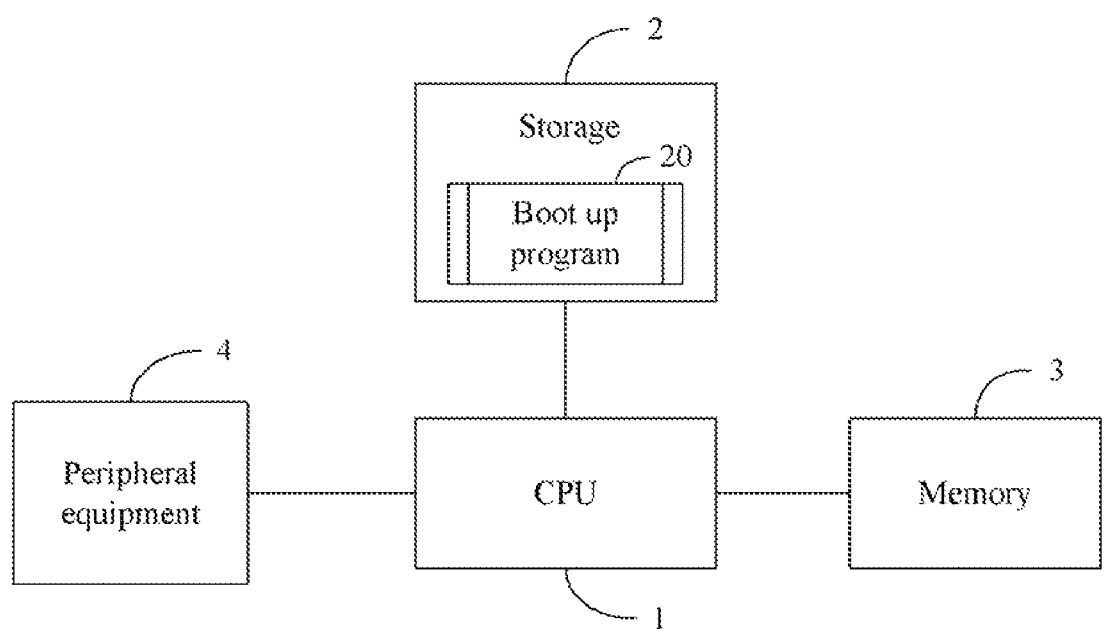
FIG. 1 is a schematic diagram of hardware configuration of a mobile phone that can be booted up quickly in accordance with a preferred embodiment.

FIG. 1 is a schematic diagram of hardware configuration of a mobile phone that can be booted up quickly in accordance with a preferred embodiment. The mobile phone typically includes a central processing unit (CPU) 1, a storage 2, a memory 3, and a peripheral equipment 4. The CPU 1 connects electronically with the storage 2, the memory 3, and the peripheral equipment 4. The storage 2 stores application software and data used in the mobile phone. The data may be telephone numbers, short messaging service (SMS) messages, and electronic-mails (E-mails), etc. The storage 2 further stores a boot up program 20. The CPU 1 loads the boot up program 20 to the memory 3 when the mobile phone is turned on, and controls the running of the boot up program 20 to start the mobile phone. The storage 2 may be read-only memory (ROM) storage, and the memory 3 may be a dynamic random access memory (DRAM) or a synchronous DRAM (SDRAM). The peripheral equipment 4 may include a liquid crystal display (LCD) screen and a keyboard.

Figure 2:
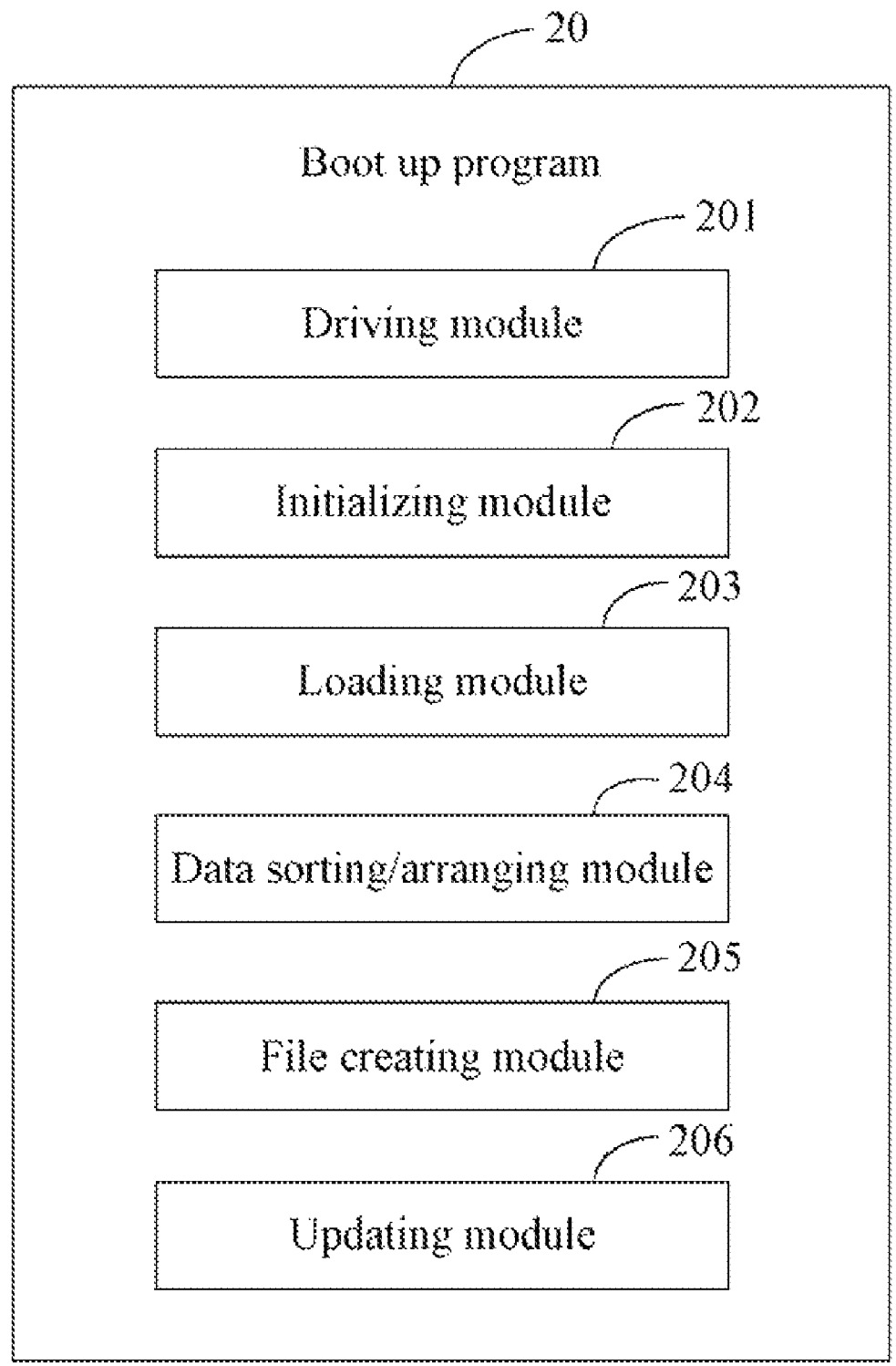
FIG. 2 is a schematic diagram showing function modules of a boot up program of FIG. 1.

FIG. 2 is a schematic diagram showing function modules of the boot up program 20 of FIG. 1. The boot up program 20 may include a driving module 201, an initializing module 202, a loading module 203, a data sorting/arranging module 204, a file creating module 205, and an updating module 206.

The driving module 201 is configured for driving hardware devices (such as the memory 3 and the peripheral equipment 4) when the mobile phone is turned on.

The initializing module 202 is configured for initializing application software (such as games, calendar, calculator, etc) installed in the mobile phone.

The loading module 203 is configured for loading data in the mobile phone from the storage 2 to the memory 3. The data may include, but is not limited to, telephone numbers, SMS messages, and E-mails.

The data sorting/arranging module 204 is configured for creating a table for each kind of data in the memory 3, and ordering data in each table according to a particular order condition. For example, the telephone numbers can be arranged in alphabetical order of people's names. The SMS messages can be arranged according to respective received time.

The file creating module 205 is configured for converting each table into a binary file, and storing the binary file in the storage 2.

The loading module 203 is further configured for loading the binary file of each table directly from the storage 2 to the memory 3 when the mobile phone is turned on. Thus, the time to boot up the mobile phone is reduced because the operation of sequencing the data is canceled.

The updating module 206 is configured for updating a corresponding binary file when new data are added in the storage 2. For example, if a new telephone number is added, the updating module 206 inserts the new telephone number into the corresponding binary file of the telephone number data. If a new SMS message is added, the updating module 206 inserts the new SMS message into the corresponding binary file of the SMS message data.

In the preferred embodiment, the loading module 203 loads the data from the storage 2. In other preferred embodiments, the loading module 203 can load the data from a subscriber identity model (SIM) card fixed in the mobile phone.

Figure 3:
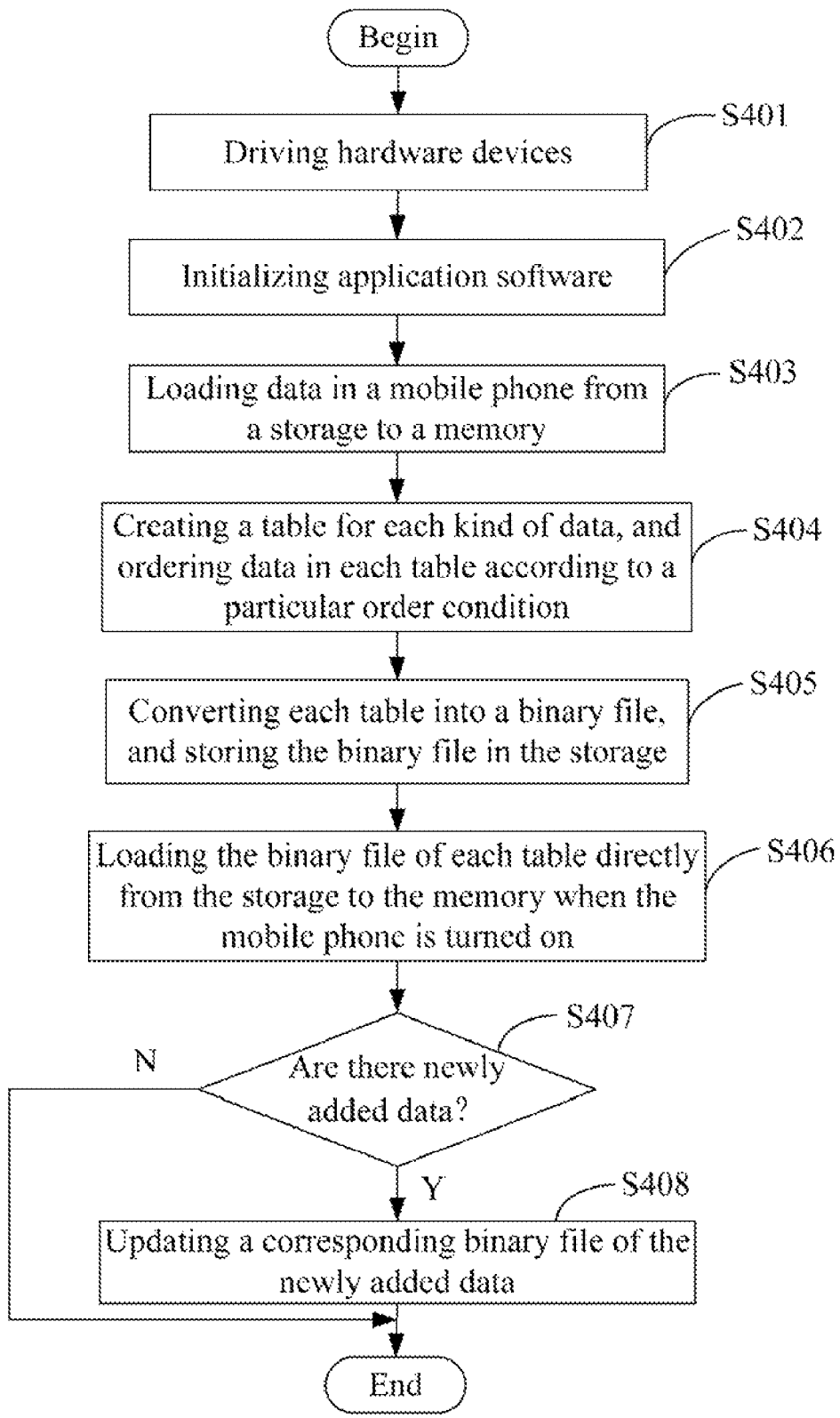
FIG. 3 is a flowchart of a preferred method for booting up a mobile phone quickly in accordance with one embodiment.

FIG. 3 is a flowchart of a preferred method for booting up a mobile phone quickly in accordance with one embodiment. In step S401, the driving module 201 drives hardware devices (such as the memory 3 and the peripheral equipment 4) when the mobile phone is turned on.

In step S402, the initializing module 202 initializes application software (such as games, calendar, calculator, etc) installed in the mobile phone.

In step S403, the loading module 203 loads the data in the mobile phone from the storage 2 to the memory 3. The data may include, but is not limited to, telephone numbers, SMS messages, and E-mails.

In step S404, the data sorting/arranging module 204 creates a table for each kind of data in the memory 3, and orders data in each table according to a particular order condition. For example, the telephone numbers are arranged in alphabetical order of people's names. The SMS messages are arranged according to respective received time.

In step S405, the file creating module 205 converts each table into a binary file, and stores the binary file in the storage 2.

In step S406, the loading module 203 loads the binary file of each table directly from the storage 2 to the memory 3 when the mobile phone is turned on. Thus, the time to start the mobile phone is reduced because the operation of sequencing the data is canceled.

In step S407, the updating module 206 judges whether there are newly added data in the storage 2. If no new data are added in the storage 2, the procedure ends.

If there are newly added data in the storage 2, in step S408, the updating module 206 updates a corresponding binary file of the newly added data. For example, if a new telephone number is added, the updating module 206 inserts the new telephone number into the corresponding binary file of the telephone number data. If a new SMS message is added, the updating module 206 inserts the new SMS message into the corresponding binary file of the SMS message data.

It should be emphasized that the above-described embodiments of the present invention, particularly, any preferred embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A mobile phone that can be booted up quickly, the mobile phone comprising:
   a driving module being configured for driving hardware devices when the mobile phone is turned on;
   an initializing module being configured for initializing application software installed in the mobile phone;
   a loading module being configured for loading data in the mobile phone from a storage to a memory, the data stored in the storage comprising telephone numbers and/or SMS messages;
   a data sorting/arranging module being configured for creating a table for each kind of data in the memory, and ordering data in each table according to a particular order condition;
   a file creating module being configured for converting each table into a binary file, and storing the binary file in the storage;
   the loading module being further configured for booting the mobile phone quickly by loading the binary file of each table directly from the storage to the memory when the mobile phone is turned on; and
   an updating module being configured for updating a corresponding binary file when new data are added in the storage.

2. The mobile phone according to claim 1, wherein the memory is a dynamic random access memory (DRAM) or a synchronous DRAM (SDRAM).

3. A method for booting up a mobile phone quickly, the method comprising:
   driving hardware devices when the mobile phone is turned on;
   initializing application software installed in the mobile phone;
   loading data in the mobile phone from a storage to a memory, the data stored in the storage comprising telephone numbers and/or SMS messages;
   creating a table for each kind of data in the memory, and ordering data in each table according to a particular order condition;
   converting each table into a binary file, and storing the binary file in the storage;
   booting the mobile phone quickly by loading the binary file of each table directly from the storage to the memory when the mobile phone is turned on and
   updating a corresponding binary file when new data are added in the storage.

4. The method according to claim 3, wherein the memory is a dynamic random access memory (DRAM) or a synchronous DRAM (SDRAM).

* * * * *